United States Patent
Hamaoka et al.

(10) Patent No.: US 7,427,841 B2
(45) Date of Patent: Sep. 23, 2008

(54) DRIVING METHOD AND DRIVER OF BRUSHLESS DC MOTOR

(75) Inventors: Koji Hamaoka, Osaka (JP); Yoshinori Takeoka, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 143 days.

(21) Appl. No.: 10/579,945

(22) PCT Filed: Nov. 16, 2004

(86) PCT No.: PCT/JP2004/016972

§ 371 (c)(1),
(2), (4) Date: May 22, 2006

(87) PCT Pub. No.: WO2005/067131

PCT Pub. Date: Jul. 21, 2005

(65) Prior Publication Data

US 2007/0145919 A1     Jun. 28, 2007

(30) Foreign Application Priority Data

Jan. 5, 2004     (JP) .............................. 2004-000084

(51) Int. Cl.
*H02P 6/00*  (2006.01)
(52) U.S. Cl. .............................. 318/400.01; 318/400.42
(58) Field of Classification Search ........................ None
See application file for complete search history.

(56) References Cited

U.S. PATENT DOCUMENTS

| | | | |
|---|---|---|---|
| 6,774,593 B2 * | 8/2004 | Kushihara | 318/254 |
| 6,906,491 B2 * | 6/2005 | Matsuo et al. | 318/722 |
| 6,984,948 B2 * | 1/2006 | Nakata et al. | 318/254 |
| 6,984,954 B2 * | 1/2006 | Leonardi et al. | 318/602 |
| 6,989,641 B2 * | 1/2006 | Schulz et al. | 318/139 |
| 7,002,318 B1 * | 2/2006 | Schulz et al. | 318/782 |

FOREIGN PATENT DOCUMENTS

| | | |
|---|---|---|
| JP | 10-150795 | 6/1998 |
| JP | 2000-083397 A | 3/2000 |
| JP | 2002-051589 A | 2/2002 |
| JP | 2002-165482 A | 6/2002 |
| JP | 2002-359991 A | 12/2002 |
| JP | 2003-199389 A | 7/2003 |

OTHER PUBLICATIONS

Sepe, R.B. Jr et al, "Fault tolerant operation of induction motor drives with automatic controller reconfiguration", 2001, IEEE International, p. 156-162.*
International Search Report for application No. PCT/JP2004/016972 dated Dec. 21, 2004.

* cited by examiner

*Primary Examiner*—Renata McCloud
(74) *Attorney, Agent, or Firm*—RatnerPrestia

(57) ABSTRACT

A method of driving a brushless DC motor includes operations of rectifying an AC voltage of an AC power source by a rectifier circuit to which a capacitor is coupled between its output terminals and the AC voltage of the AC power source is input; driving the motor by an inverter coupled to the rectifier circuit; detecting a rotor position of the motor by a position detector based on a motor back electromotive force or a motor current; estimating the rotor position by a position estimator when the rotor position is not detectable by the position detector; and controlling the inverter by a controller based on the rotor position detected by the position detector or the rotor position estimated by the position estimator.

7 Claims, 3 Drawing Sheets

DRIVING METHOD AND DRIVER OF BRUSHLESS DC MOTOR

This application is a U.S. National Phase Application of PCT International Application PCT/JP2004/016972.

TECHNICAL FIELD

The present invention relates to driving methods and drivers of brushless DC motors installed in compressors used in freezing and air conditioning systems such as refrigerators and air conditioners. More particularly, the present invention relates to methods and units for detecting the position of a motor rotor without using a special position-detecting sensor such as a Hall element and encoder in motor drivers downsized by drastically reducing a capacitance of a smoothing capacitor in a rectifier circuit.

BACKGROUND ART

In general, a conventional motor driver of driving a motor installed in the compressor of a refrigerating and air conditioning system has the following structure. The motor driver includes a rectifier circuit for rectifying the AC voltage input from the AC power source, and an inverter for driving the motor coupled to this rectifier circuit. A smoothing capacitor with a sufficiently large capacitance is coupled between the output terminals of the rectifier circuit.

This driver detects the rotational position of the motor rotor based on the back electromotive force produced in the motor stator coil while the motor rotates or based on the motor current, without relying on a special position-detecting sensor such as a Hall element and encoder. The driver uses this detection signal for sequentially switching power distribution among the switching elements in the inverter to drive the motor by controlling the commutation of the current traveling in the stator coil.

This type of drive method which does not use a special position-detecting sensor is generally called a sensorless drive. Motors installed in the compressors of refrigerating and air conditioning systems adopt this sensorless drive since it is very difficult to provide a position-detecting sensor in a high-temperature and high-pressure atmosphere, refrigerant atmosphere, or oil atmosphere inside the compressor.

More recently, attempts to drastically reduce the capacitance of the smoothing capacitor in the rectifier circuit have been made to downsize the motor driver, as typically disclosed in Japanese Patent Unexamined Publication No. 2002-51589.

This type of conventional motor driver is described next with reference to a drawing. FIG. 6 is a block diagram of a conventional motor driver. The output of single-phase AC power source 1 is coupled to diode full-wave rectifier circuit 2. The output of this diode full-wave rectifier circuit 2 is coupled to smoothing capacitor 3. This smoothing capacitor 3 has a very small capacitance of about 1% of a conventional capacitor.

PWM (pulse-width modulation) inverter 4 is coupled to both ends of this smoothing capacitor 3. This PWM inverter 4 includes six switching elements (including a reverse diode) in a three-phase bridge connection. Three-phase windings are provided around the stator of motor 5. Each of one end of the three-phase windings is respectively coupled to the output of PWM inverter 4. Accordingly, motor 5 is driven by PWM inverter 4.

As shown in FIG. 6, control circuit 6 receives information including the voltage of single-phase AC power source 1, DC-part current, output current of PWM inverter 4, and positional information on position-detecting sensor 7; and controls the gates of six switching elements configuring PWM inverter 4 so as to optimally drive the motor.

In the above conventional structure, the rotor position is detectable even if the DC voltage applied to the inverter drops when an encoder or Hall element is employed as a position-detecting sensor. However, when it is not feasible to install a position-detecting sensor, such as in the case of a compressor, the above conventional structure is not applicable.

In general, known methods of driving a brushless DC motor without using a special position-detecting sensor (sensorless drive method) include a method of detecting the rotor position based on the back electromotive force produced in the motor stator coil and a method of detecting the rotor position based on the motor current.

In a motor driver that adopts one of the above conventional sensorless drive methods, the rotor position is detectable only when the capacitance of the smoothing capacitor is sufficiently large and the ripple voltage in the voltage across the smoothing capacitor (the output voltage of the rectifier circuit) is small. This is because the back electromotive force or motor current is stable enough to reliably detect the rotor position only when the capacitance of the smoothing capacitor is sufficiently large and the ripple voltage in the output voltage of the rectifier circuit is small.

If the capacitance of the smoothing capacitor in a motor driver adopting the conventional sensorless drive method is drastically reduced so as to downsize the entire unit to the size of the driver using a special detecting sensor as shown in FIG. 6, the ripple voltage drastically increases. This makes the back electromotive force needed for detecting the rotor position undetectable; or the motor current needed for detecting the rotor position not to flow when the voltage applied to the PWM inverter is low.

Consequently, accurate detection of the rotor position becomes difficult, leading to drastic deviation in commutation timing by the PWM inverter. This results in the application of high motor currents as well as reducing the motor's efficiency. In the worst case, a failure due to the motor stopping may occur.

SUMMARY OF THE INVENTION

The present invention solves the above disadvantage of the prior art. One object of the present invention is to drastically reduce a capacitance of a smoothing capacitor coupled to a rectifier circuit, and to offer a motor driving method and driver that allow stable motor driving in spite of a large ripple voltage being present in the voltage across the smoothing capacitor (output voltage of the rectifier circuit) in the sensorless drive that does not require a special position-detecting sensor.

The motor drive method of the present invention includes the following operations of rectifying an AC voltage by a rectifier circuit to which a capacitor is coupled between its output terminals and the AC voltage of an AC power source is input; driving the motor using an inverter coupled to the rectifier circuit; detecting a rotor position of the motor based on the motor's back electromotive force or motor current by a position detector; estimating the rotor position by means of a position estimator when the position detector cannot detect the rotor position; and controlling the inverter by a controller based on the rotor position detected by the position detector or the rotor position estimated by the position estimator.

The motor driver of the present invention includes a rectifier circuit configured with a diode bridge circuit for rectifying the AC voltage of the input AC power source; a capacitor coupled between output terminals of the rectifier circuit; the inverter also coupled to the rectifier circuit; the position detector for detecting a rotor position of the motor based on the motor back electromotive force of the motor driven by the inverter or the motor current; the position estimator for estimating the rotor position when the position detector cannot detect the position; and a controller for operating the inverter by switching between an output signal of the position detector and an output signal of the position estimator.

One characteristic of the motor driving method and driver of the present invention is to operate the inverter by estimating the rotor position when the position detector cannot detect the rotor position. This allows commutation of the current in accordance with the estimated position, even when the rotor position is not detectable, offering stable motor operation.

REFERENCE MARKS IN THE DRAWINGS

Figure 1:
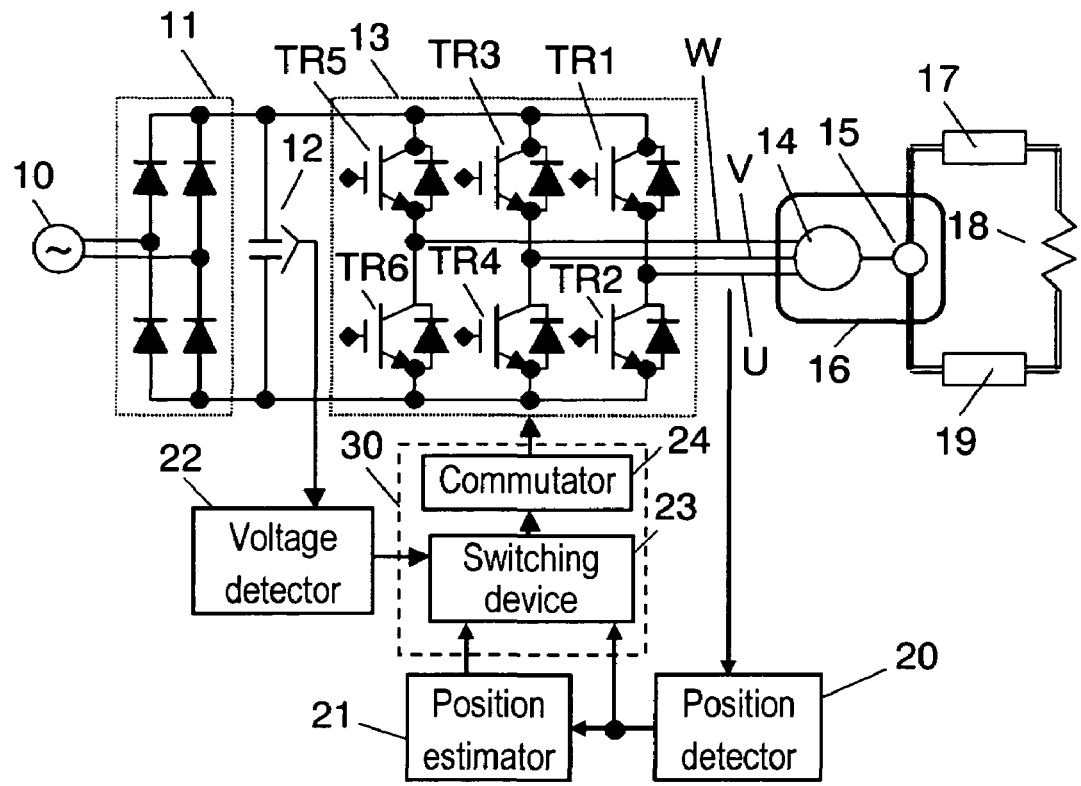
FIG. 1 is a block diagram of a motor driver in accordance with a preferred embodiment of the present invention.

10 AC power source
11 Rectifier circuit
12 Capacitor
13 Inverter
14 Brushless DC motor
16 Compressor
20 Position detector
211 Position estimator
22 Voltage detector
23 Switching device
24 Commutator
30 Controller

DETAILED DESCRIPTION OF THE PREFERRED EMBODIMENTS

A preferred embodiment of the present invention is described below with reference to drawings. FIG. 1 is a block diagram of a motor driver in the preferred embodiment of the present invention. The motor driver shown in FIG. 1 is configured as below.

The motor driver includes rectifier circuit 11 configured with a diode bridge circuit for rectifying AC voltage input from AC power source 10, capacitor 12 coupled between output terminals of rectifier circuit 11, inverter 13 also coupled to rectifier circuit 11, position detector 20 for detecting the rotational position of the rotor of motor 14 based on the back electromotive force of motor 14 driven by inverter 13 or motor current, position estimator 21 for estimating the rotor position when this position is not detectable by position detector 20, and controller 30 for operating inverter 13 by switching between the output signal from position detector 20 and the output signal from position estimator 21.

The motor driver shown in FIG. 1 is further detailed next. In FIG. 1, AC power source 10 is mains power supply, which is 100 V 50 Hz or 60 Hz in Japan. The diode bridge circuit which configures rectifier circuit 11 has four diodes in a bridge connection. Rectifier circuit 11 receives the AC voltage of AC power source 10, and this AC voltage undergoes full-wave rectification in the diode bridge circuit. Capacitor 12 is coupled between the output terminals of rectifier circuit 11. This capacitor 12 is a capacitor with a smaller capacitance than that of the smoothing capacitor used in a conventional motor driver. In the motor driver in the preferred embodiment shown in FIG. 1, capacitor 12 is a 1 μF multilayer ceramic capacitor. High-voltage multilayer ceramic capacitors with a larger capacitance than before are now available in chips.

On the other hand, in the conventional motor driver, a high-capacitance electrolytic capacitor (several hundred μF in case of 200 W output) is typically used as the smoothing capacitor. Conventionally, the capacitance of this smoothing capacitor is determined based on the output capacitance (W or VA) of the inverter or the input capacitance (W or VA) of the entire driver, the withstand ripple current of the smoothing capacitor in relation to the ripple content in the DC voltage or the ripple current, and so on. Taking into account these conditions, a capacitance of about 2 μF/W to 4 μF/W is generally adopted. More specifically, when the output capacitance of the inverter is 200 W, an electrolytic capacitor of about 400-800 μF is used.

In contrast, the motor driver in the preferred embodiment shown in FIG. 1 uses a capacitor with a capacitance of 1 μF/W or less for capacitor 12. More specifically, when the output capacitance of inverter 13 is 200 W, capacitor 12 of 20 μF or smaller is used.

Inverter 13 has six switching elements TR1, TR2, TR3, TR4, TR5, and TR6 in a three-phase bridge connection. An insulated gate bipolar transistor (IGBT) is used for each of these switching elements. A flywheel diode is coupled in the reverse direction between the collector and emitter of each transistor.

Motor 14 is driven by the three-phase output of inverter 13. Windings in a three-phase star connection are provided around the stator of motor 14. Here, either concentrated winding or distributed winding is acceptable.

A permanent magnet is disposed on the rotor. Either a surface permanent magnet type (SPM), in which the permanent magnet is disposed on the surface of the stator core, or an interior permanent magnet type (IPM) in which the permanent magnet is embedded inside the stator core is acceptable. Still more, the permanent magnet can be a ferrite magnet or rare-earth magnet.

Compressor element 15 is coupled to the rotor shaft of motor 14. This compressor element 15 takes in the refrigerant gas, compresses it, and then discharges it. This motor 14 and compressor element 15 are housed in the same hermetic container to configure compressor 16. The refrigerating and air conditioning system is configured such that the discharged gas compressed by compressor 16 passes through condenser 17, pressure reducer 18, and evaporator 19, and then returns to the compressor intake. In this system, cooling or heating is made feasible by heat release in condenser 17 and heat absorption in evaporator 19. In some case, an air blower is provided to condenser 17 or evaporator 19 to further accelerate the heat exchange.

Position detector 20 detects the rotational position of the rotor of motor 14 based on the back electromotive force of motor 14 or from the motor current. In the preferred embodiment, the method of detecting the rotational position of the rotor based on the back electromotive force produced in the stator coil is described. Inverter 13 is driven by a rectangular wave in the three-phase 120-degree system.

Next, details of this drive system are described. Windings in a three-phase star connection are provided around the stator of motor 14. These three-phase windings are called U-phase winding, V-phase winding, and W-phase winding. Inverter 13 commutates the motor current in line with the rotational position of the rotor, i.e., in every electrical angle of 60 degree sequentially from the U phase to V phase, U phase to W phase, V phase to W phase, V phase to U phase, W phase to U phase, and W phase to V phase.

For example, when focusing on the U-phase winding, electricity flows for the period corresponding to 120 degree in electrical angle, stopped for the period corresponding to 60 degree in electrical angle, and then turned on in the reverse direction for the period corresponding to 120° electrical angle. Electricity flows in the same way to the V-phase and W-phase windings. The mutual electrical phase difference among the U phase, V phase, and W phase is 120 degree in electrical angle.

It is apparent from the above description that a phase with no power distribution (break period) exists in the three-phase 120-degree rectangular wave driving system. The rotor position is detected by detecting the zero crosspoint of a back electromotive force which is generated in the phase during this break period. Position detector 20 detects this rotor position.

Position estimator 21 measures the time of the detection timing when position detector 20 normally detects the position, and estimates the rotational position of the rotor based on this timing time. Voltage detector 22 detects the voltage across capacitor 12, and determines whether detected voltage is larger or smaller than a predetermined value.

Switching device 23 receives the output signal of position detector 20, the output signal of position estimator 21, and the output signal of voltage detector 22. This switching device 23 selects the output signal of position detector 20 or the output signal of position estimator 21 based on the output signal of voltage detector 22, which means the above determination result of voltage detector 22, and outputs a selected output signal to commutator 24. The output signal (commutation signal) of this commutator 24 is input to six IGBT gates of inverter 13 so that on and off of IGBTs are controlled. Here, controller 30 includes switching device 23 and commutator 24.

The operation of the motor driver as configured above in the preferred embodiment of the present invention is described next. AC voltage of AC power source 10 undergoes full-wave rectification in the diode-bridge circuit configuring rectifier circuit 11. However, since the capacitance of capacitor 12 is extremely small compared to the prior art, the output voltage of rectifier circuit 11 (voltage across capacitor 12) is scarcely smoothed, and a large ripple is present.

Position detector 20 detects the rotor position of motor 14 based on the counter-electromagnetic force produced in the stator coil in line with motor rotation or based on the motor current. However, when the output voltage of rectifier circuit 11 is low, the position is not detectable because required voltage or current is not sufficiently secured.

On the other hand, position estimator 21 always detects the timing of position detection by position detector 20. When the position detection signal is not input, position estimator 21 outputs the position estimation signal at the timing same as before.

If the voltage across capacitor 12 detected by voltage detector 22 is higher than a predetermined value (50V in this embodiment), switching device 23 selects the output signal from position detector 20, and outputs the position detection signal to commutator 24. Contrarily, if the voltage is lower than the predetermined value, switching device 23 selects the output signal from position estimator 21, and outputs the position estimation signal to commutator 24.

Here, voltage detector 22 detects a change in the voltage across capacitor 12, and the feed-forward control is applied to the PWM control duty so as to keep the voltage or current output from inverter 13 constant, but this is omitted in FIG. 1. The PWM control duty represents the ON period ratio to (ON period+OFF period) in the PWM control.

In other words, if the voltage across capacitor 12 is high against the reference duty gained by speed control, the duty is lowered, and if the voltage across capacitor 12 is low, the duty is increased in order to adjust the output voltage or current from inverter 13. This enables smooth driving of motor 14.

Figure 2:
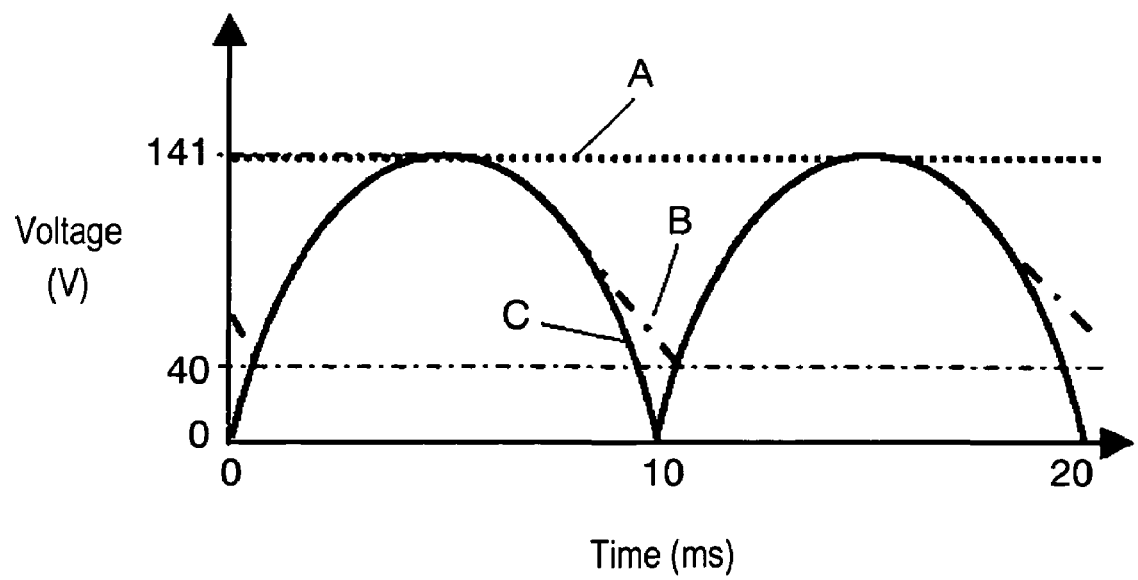
FIG. 2 is a timing chart illustrating a voltage waveform of a capacitor in the motor driver shown in FIG. 1.

Next, a voltage waveform at both ends of capacitor 12 is described with reference to FIGS. 2 and 1. FIG. 2 is a timing chart illustrating the voltage waveform of capacitor 12 in the preferred embodiment of the present invention.

In FIG. 2, the vertical axis is voltage, and the horizontal axis is time. AC power source 10 supplies AC voltage 100V 50 Hz. Dotted line A in FIG. 2 represents the state when the load current is very small (almost no current), and thus voltage scarcely reduces because electric charge of capacitor 12 is scarcely discharged.

The load current refers to the output current from the rectifier circuit, which is the input current to inverter 13. In dotted line A, an average voltage is 141V, the ripple voltage is 0V, and ripple content is 0%. Here, Ripple voltage [V]=Instantaneous maximum voltage [V]−Instantaneous minimum voltage [V]. Ripple content [%]=(Ripple voltage [V]/Average voltage [V])×100.

Then, as the load current increases, a part of electric charge of capacitor 12 is discharged, and the instantaneous minimum voltage decreases as shown by dashed line B. However, the instantaneous maximum voltage which is determined by the supply voltage remains unchanged at 141V. In case of dashed line B, the average voltage is about 112V because the instantaneous minimum voltage is 40V. The ripple voltage is 101V and ripple content is 90%.

When the load current is further increased, almost no electric charge is stored in capacitor 12, and thus the instantaneous maximum voltage drops to almost 0V as shown by solid line C. However, the instantaneous maximum voltage which is determined by the supply voltage remains unchanged at 141V. In the case of solid line C, the average voltage is about 100V because the instantaneous minimum voltage is 0V. The ripple voltage is 141V and ripple content is 141%.

When the capacitance of capacitor 12 is small, as in the above case, the load current is scarcely smoothened, and thus it still has a waveform of full-wave rectification of input AC power source 10.

Figure 3:
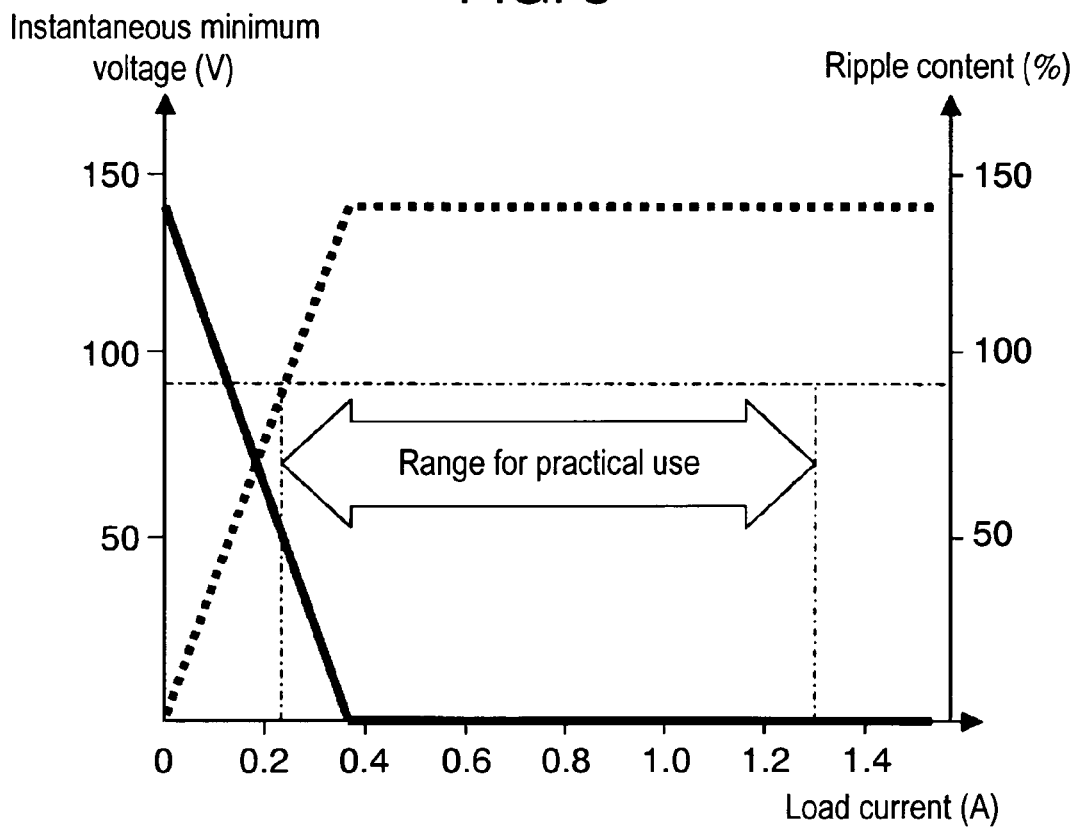
FIG. 3 is a characteristics chart illustrating instantaneous minimum voltage and ripple content against load current in the motor driver shown in FIG. 1.

Next, the relation between the instantaneous minimum voltage and ripple content against the load current is further detailed with reference to FIG. 3. FIG. 3 illustrates characteristics of the instantaneous minimum voltage and ripple content against the load current in the preferred embodiment. In FIG. 3, the horizontal axis is the load current, and the vertical axis is the instantaneous minimum voltage and ripple content. The solid line shows the characteristic of the instantaneous minimum voltage and the dotted line shows the characteristic of the ripple content.

In the case of the current waveform shown by dotted line A in FIG. 2, the load current is 0 A, the instantaneous minimum voltage is 141V, and ripple content is 0%. In the case of the current waveform shown by dashed line B, the load current is 0.25 A, instantaneous minimum voltage is 40V, and ripple content is 90%. In the case of the current waveform shown by solid line C, the load current is 0.35 A, instantaneous minimum voltage is 0V, and ripple content is 141%. When the current is 0.35 A or higher, both instantaneous minimum voltage and ripple content remain unchanged.

In the motor driver in the preferred embodiment, a range for practical use is when the load current is between 0.25 A and 1.3 A. Capacitor 12 with small capacitance which always maintain the ripple content of 90% or higher within the practical use range is selected.

In the preferred embodiment, as described previously, the position is not detectable when the output voltage of the rectifier circuit is 50V or lower. Consequently, the rotor position is not detectable at some part in the entire practical use range.

Figure 4:
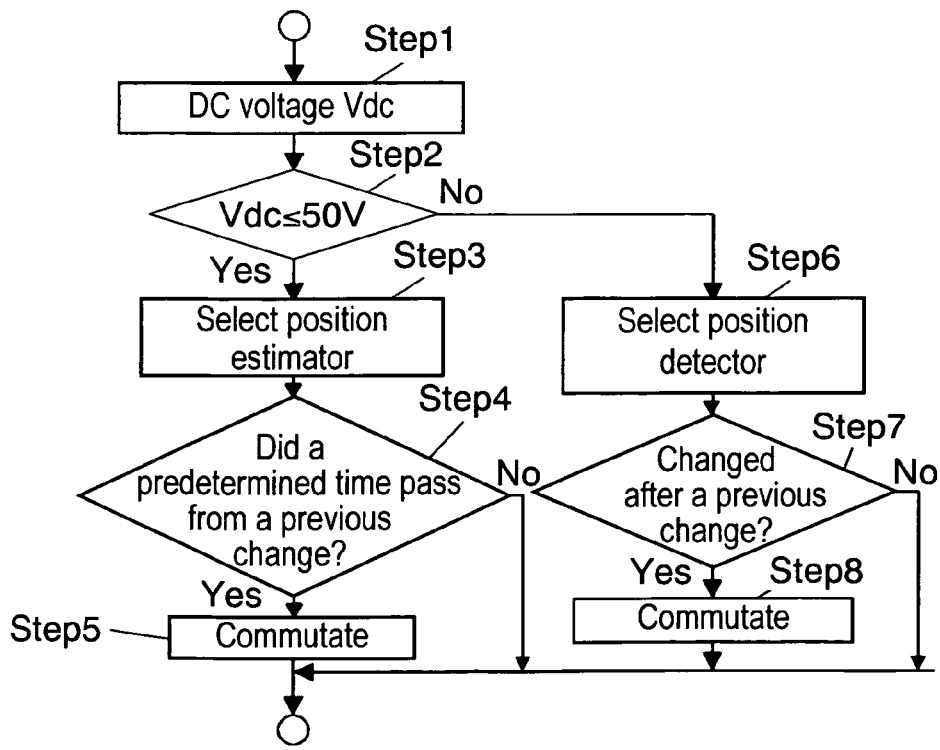
FIG. 4 is a flow chart illustrating the operation of the motor driver shown in FIG. 1.

Next, the operation in FIG. 1 is further detailed with reference to FIGS. 4 and 1. FIG. 4 is a flow chart of the operation in the preferred embodiment.

First, in STEP 1, voltage detector 22 detects DC voltage Vdc. Here, DC voltage Vdc is the output voltage of rectifier circuit 11, which is the voltage across capacitor 12.

Next, in STEP 2, DC voltage Vdc detected in STEP 1 is compared with a predetermined voltage 50V at which the position becomes undetectable by position detector 20. If DC voltage Vdc is less than 50V, the operation proceeds to STEP 3. In STEP 3, switching device 23 selects position estimator 21, and switches from previous position detector 20.

In STEP 4, position estimator 21 determines whether a predetermined time has passed from a previous change in the position detection signal. This predetermined time is the time previously determined based on position detection, and the time changes in line with the number of rotations. If the predetermined time has not passed, the operation passes the next step and completes. If the predetermined time has passed, the operation proceeds to STEP 5. In STEP 5, commutator 24 switches the switching elements of inverter 13 as commutation, that is position detection, is executed.

In STEP 2, when DC voltage Vdc detected in STEP 1 is 50V or higher at comparing with predetermined voltage 50V, at which the position becomes undetectable, the operation proceeds to STEP 6. In STEP 6, switching device 23 selects position detector 20.

In STEP 7, position detector 20 determines whether the state of the position detection signal is changed from a previous change. If the state is not changed, the operation passes the next step and completes. If the state is changed, the operation proceeds to STEP 8. In STEP 8, commutator 24 switches the switching elements of inverter 13 as commutation, that is position detection, is executed.

These operations are repeated within a predetermined time so as to constantly detect the state of DC voltage by means of voltage detector 22, and switch between the output signal of position detector 20 and the output signal of position estimator 21 by means of switching device 23 based on the detected state. This enables commutation even under conditions when the position is undetectable due to low DC voltage, thus making continuous operation feasible.

Figure 5:
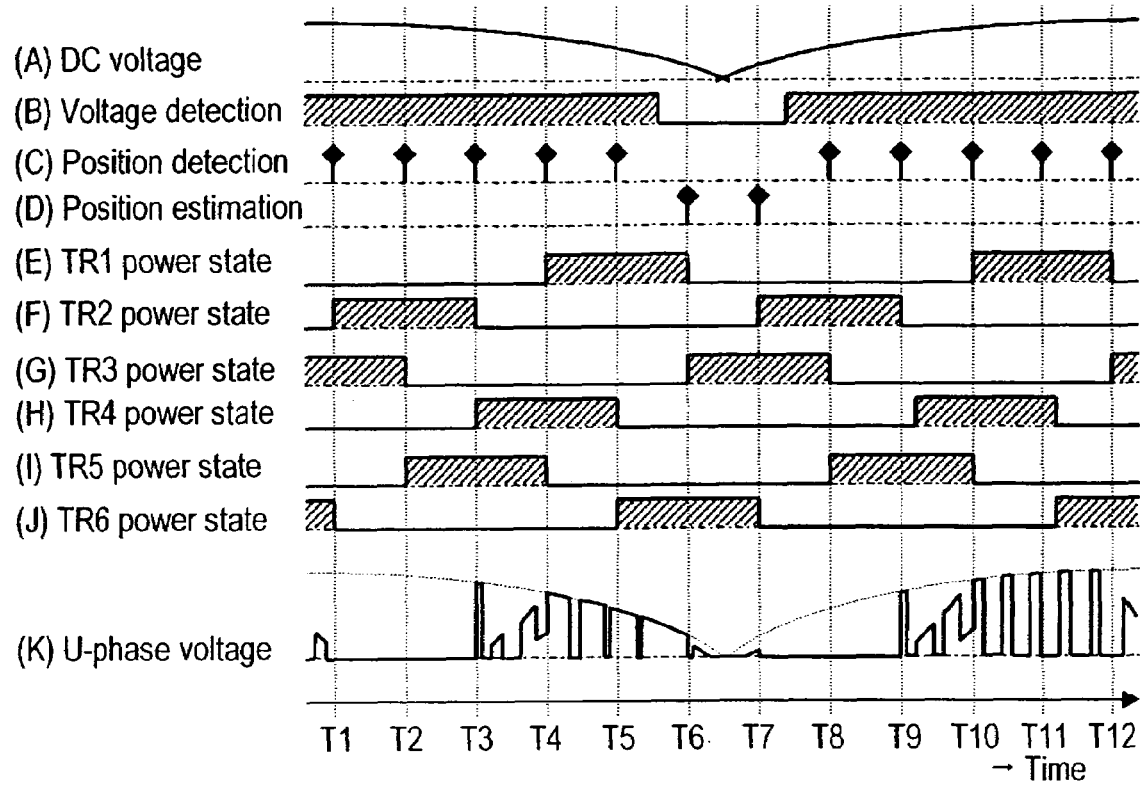
FIG. 5 is a timing chart illustrating a waveform in each part of the motor driver shown in FIG. 1.
Figure 6:
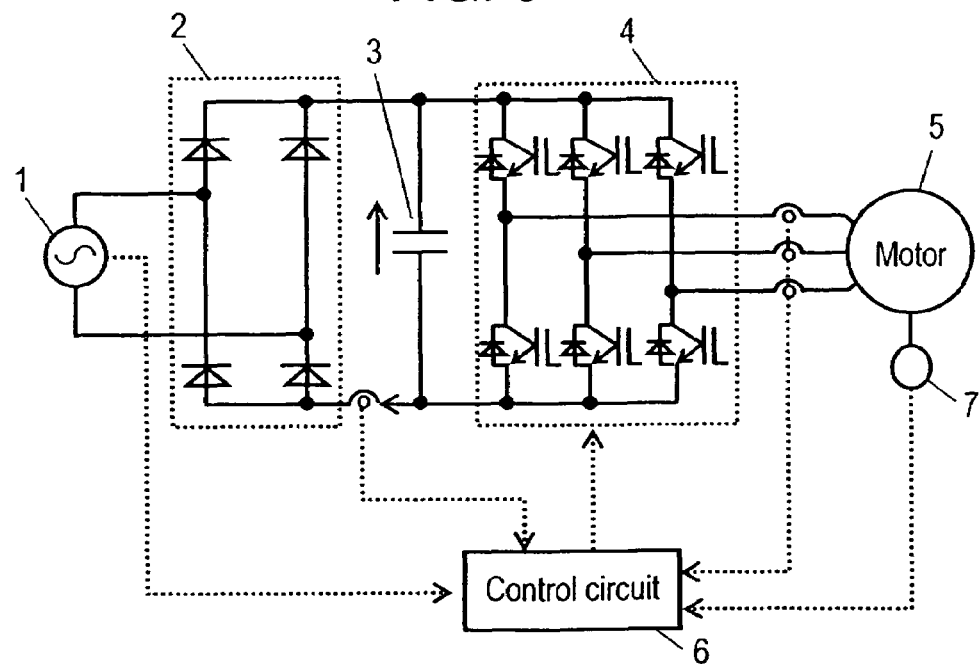
FIG. 6 is a block diagram of a conventional motor driver.

Waveforms generated when the above operations are executed are described next with reference to FIGS. 5 and 1. FIG. 5 is a timing chart showing the waveforms generated in each part of the motor driver in the preferred embodiment shown in FIG. 1.

In FIG. 5, DC voltage (A) is the voltage across capacitor 12. Voltage detection (B) is the output of voltage detector 22. Voltage detector 22 outputs the result of comparing DC voltage (A) with a predetermined voltage (50 V in the preferred embodiment). A signal for high level is output when DC voltage (A) is 50 V or higher, and a signal for low level is output when DC voltage is less than 50 V. FIG. 5 shows the case when DC voltage (A) is 50 V or lower in time T6 and T7.

Position detection (C) is the output of position detector 20. Position estimation (D) is the output of position estimator 21. When DC voltage is 50 V or higher, position detector 20 can detect the position. Accordingly, the position is detectable under normal conditions between time T1 and T5 and between time T8 and T12.

On the other hand, between time T6 and T7 in FIG. 5, the DC voltage is less than 50 V, and thus the position detection signal is not output from position detector 20. Even when the detection signal is output, it may be output at wrong timing, and has a high risk of causing erroneous operation.

Therefore, during time T6 and T7, a signal from position estimator 21 is used as a commutation signal. Position estimator 21 starts measuring the time from T5, which is the previous commutation timing. When a predetermined time passes from T5, commutation takes place at the timing of time T6.

In the same way, commutation takes place also at the timing of T7 after a predetermined time passes from T6. The predetermined time here means the time which allows normal detection of the position. For example, the time between time T4 and T5 is measured and set as the predetermined time. The predetermined time can be measured typically by a timer provided to position estimator 21.

As described above, switching device 23 selects and outputs the output signal from position detector 20 during time T1 to T5 and during time T8 to T12. During time T6 to T7, switching device 23 selects and outputs the output signal from position estimator 21. The output of switching device 23 is input to commutator 24, and commutator 24 turns on and off six switching elements of inverter 13 as shown in FIG. 5: TR1 power state (E), TR2 power state (F), TR3 power state (G), TR4 power state (H), TR5 power state (I), and TR6 power state (J). In FIG. 5, the high level is the power ON state and the low level is the power OFF state during power states (E) to (J).

As an example of the output voltage waveform of inverter 13, U-phase voltage (K) is shown in FIG. 5. The maximum output voltage is restricted by DC voltage (A), and the envelope (indicated by the dotted line) matches DC voltage (A).

As previously described, the duty of the PWM control is changed by the voltage level of the DC voltage (A). Accordingly, as shown in U-phase voltage (K) in FIG. 5, the duty is set high (long ON period) when the U-phase voltage is low (e.g., between time T5 and T6), and the duty is set low (short ON period) when the U-phase voltage is high (e.g., between T11 and T12). This prevents the U-phase current from becoming unstable due to fluctuation of the U-phase voltage. This also applies to the V phase and W phase.

In the preferred embodiment, voltage detector 22 directly detects the voltage level. However, the voltage level may also be estimated in response to the time based on the result of detecting, for example, the zero crosspoint timing of the voltage level.

Still more, in the preferred embodiment, switching device 23 switches between position detector 20 and position estimator 21 based on the DC voltage, which is the voltage across capacitor 12. However, a method of switching automatically to the position estimation signal from position estimator 21 when the position detection signal is not output from position detector 20 is also applicable.

Still more, the preferred embodiment is described with reference to a compressor. However, the present invention is also applicable to other types of equipment which require large inertia, such as air blowers. In that case, the motor can rotate stably because of a large inertia load, even though the capacitance of the capacitor is small and a large ripple is present in the rectifying voltage. Accordingly, equipment can be drastically downsized to a previously inconceivable degree.

Furthermore, in the preferred embodiment, position detector 20 detects the rotor position in real time. However, other methods such as the method of checking average timing difference between the entire position detection and commutation are also applicable.

As described above, the motor driver of the present invention operates inverter 13 by estimating the rotor position when position detector 20 cannot detect the position. Estimation of the rotor position when it is undetectable and commutation of inverter 13 using the position estimation signal which is equivalent to the position detection signal from position detector 20 enable stable operation.

Still more, capacitor 12 has a capacitance such that the output voltage of rectifier circuit 11 has 90% or higher ripple content within the output range for practical motor driving. The motor driver of the present invention enables efficient and stable driving of the motor even if the ripple voltage is large. Accordingly, a capacitor with small capacitance which drops the ripple voltage to almost 0 V can be used. As a result, an extremely small motor driver is made feasible.

Still more, the motor driver of the present invention estimates that the position changes after every predetermined time when the position is undetectable. Accordingly, when the position is undetectable, motor 14 such as for compressor 16 operates by inertia. This makes stable operation feasible and also prevents motor stoppage.

Still more, the motor driver of the present invention determines that position detection is impossible when the output voltage of rectifier circuit 11 is lower than a predetermined voltage so as to accurately determine the part at which the position is undetectable. This enables even more stable operation.

Still more, the motor driver of the present invention includes position estimator 21 for estimating the position when position detector 20 cannot detect the position, and controller 30 for switching between position detector 20 and position estimator 21, so as to operate inverter 13. This enables reliable position detection even if the position is not detectable, and thus offers efficient and stable operation.

Still more, the motor driver of the present invention uses a timer for determining the estimated position when the position is undetectable. This enables stable operation with a simple structure for systems such as a compressor which has moderate inertia (inertia moment).

Still more, the motor driver of the present invention operates inverter 13 using the output from position estimator 21 when the voltage across capacitor 12 detected is lower than a predetermined voltage, so as to accurately determine the state when the position becomes undetectable due to declining DC voltage; and executes the switching operation appropriately. This enables even more stable operation.

Still more, the motor driver of the present invention reduces the capacitance of capacitor 12 in applications where the position-detecting sensor cannot be attached, such as the case of driving compressor 16 in a refrigerating and air conditioning system. This permits a drastic and previously inconceivable reduction in size.

Furthermore, in driving an air blower for feeding air, the motor driver of the present invention enables rotation without a significant effect of the large ripple to the number of rotations due to the use of a small-capacitance capacitor in applications where a large inertia is present, particularly air blowers. This permits a drastic and previously inconceivable reduction in size.

INDUSTRIAL APPLICABILITY

The driving method and driver of the brushless DC motor of the present invention estimate the rotor position using a position estimator even when the position detector cannot detect the rotor position of the motor, so as to operate the inverter based on the estimated position, thus permitting stable driving of the motor. The present invention is applicable to motor driving of a broad range of equipment as well as driving brushless DC motors installed in equipment such as in compressors for refrigerating and air conditioning systems.

The invention claimed is:

1. A method of driving a brushless DC motor comprising:
   rectifying an AC voltage by a rectifier circuit configured with a diode bridge circuit, a capacitor being coupled between output terminals of the rectifier circuit and the AC voltage of an AC power source being input to the rectifier circuit;
   driving the brushless DC motor by an inverter coupled to the rectifier circuit;
   detecting a rotor position of the brushless DC motor by a position detector based on one of a back electromotive force of the brushless DC motor and a motor current;
   estimating the rotor position by a position estimator when a voltage between terminals of the capacitor is lower than a predetermined voltage, wherein the rotor position is not detectable by the position detector; and
   controlling the inverter by a controller based on one of the rotor position detected by the position detector and the rotor position estimated by the position estimator,
   wherein the capacitor has a capacitance that a ripple content in an output voltage of the rectifier circuit becomes not less than 90% in an output range for practical use in driving the brushless DC motor.

2. The method of driving the brushless DC motor as defined in claim 1, wherein the position estimator specifies a predetermined time based on a detection time when the rotor position is detectable by the position detector, and estimates the rotor position on a precondition that the position shifts after the predetermined time when the voltage between the terminals of the capacitor is lower than the predetermined voltage.

3. A brushless DC motor driver comprising:
   a rectifier circuit for rectifying an AC voltage input from an AC power source, the rectifier circuit being configured with a diode bridge circuit;
   a capacitor coupled between output terminals of the rectifier circuit;
   an inverter coupled to the rectifier circuit;
   a position detector for detecting a rotor position of the brushless DC motor based on one of a back electromotive force of the brushless DC motor driven by the inverter and a motor current;
   a position estimator for estimating the rotor position when a voltage between terminals of the capacitor is lower than a predetermined voltage wherein it is not detectable by the position detector; and
   a controller for operating the inverter by switching between an output signal from the position detector and an output signal from the position estimator,
   wherein the capacitor has a capacitance that a ripple content in an output voltage of the rectifier circuit becomes not less than 90% in an output range for practical use in driving the brushless DC motor.

4. The brushless DC motor driver as defined in claim 3, wherein the inverter is configured with six switching elements in a three-phase bridge connection.

5. The brushless DC motor driver as defined in claim 3, wherein the position estimator has a timer, the position estimator specifying a predetermined time based on a detection time when the rotor position is detectable by the position detector, and determining an estimated rotor position using the timer when the voltage between the terminals of the capacitor is lower than the predetermined voltage.

6. The brushless DC motor driver as defined in claim 3, wherein the brushless DC motor drives a compressor in a refrigerating and air conditioning system.

7. The brushless DC motor driver as defined in claim 3, wherein the brushless DC motor drives an air blower for feeding air.

* * * * *